(12) United States Patent
Arashi et al.

(10) Patent No.: US 7,343,450 B2
(45) Date of Patent: Mar. 11, 2008

(54) OPTICAL DISK RECORDING APPARATUS

(75) Inventors: Masahiko Arashi, Osaka (JP); Katsuo Tokuhara, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 357 days.

(21) Appl. No.: 11/103,631

(22) Filed: Apr. 12, 2005

(65) Prior Publication Data

US 2005/0240722 A1    Oct. 27, 2005

(30) Foreign Application Priority Data

Apr. 13, 2004    (JP) ............................ P2004-117997

(51) Int. Cl.
*G06F 12/02*    (2006.01)
(52) U.S. Cl. .................... 711/113; 711/112; 710/56
(58) Field of Classification Search ............ None
See application file for complete search history.

(56) References Cited

U.S. PATENT DOCUMENTS

2002/0122658 A1*    9/2002    Fukuda et al. ............ 386/95

FOREIGN PATENT DOCUMENTS

| JP | A-2001-290605 | 10/2001 |
|---|---|---|
| JP | A-2002-132452 | 5/2002 |
| JP | 2002-335495 | 11/2002 |

* cited by examiner

*Primary Examiner*—T Nguyen
(74) *Attorney, Agent, or Firm*—Morgan, Lewis & Bockius LLP

(57) ABSTRACT

An optical disk apparatus includes a data conversion unit that converts input video data into record data, a data record unit that temporarily stores the record data in buffer memory and writes on to an optical disk while maintaining data continuity, and a control unit that controls the data record unit and the data conversion unit. The control unit acquires free space of the buffer memory in a reference data unit smaller than a video object unit when the video data is converted into record data in the video object unit, instructs to divide the record data into the reference data units and to store in the buffer memory based on the acquired free space, to convert the video data into record data when the record data is stored, and to divide termination processing data in to the reference data units and to store when a record stop instruction is input.

4 Claims, 3 Drawing Sheets

OPTICAL DISK RECORDING APPARATUS

BACKGROUND OF THE INVENTION

1. Field of the Invention

This invention relates to an optical disk apparatus for recording data to be recorded such as input video data on an optical disk and in particular to record processing of data to be recorded.

2. Description of the Related Art

To record data on an optical disk in an optical disk apparatus capable of recording data on an optical disk such as a DVD, the record data needs to be recorded continuously at constant speed. Thus, an optical disk apparatus in a related art is provided with buffer memory for temporarily storing encoded data before being recorded to maintain the data record continuity. At the time, if data is not stored in the buffer memory, data record on an optical disk is forcibly interrupted and the data record continuity cannot be maintained and when the buffer memory fills with data, encode processing must be interrupted at the point in time. Thus, the amount of the data stored in the buffer memory needs to be monitored.

Proposed as a unit for monitoring such data stored in buffer memory is a unit for interrupting data record on an optical disk if a buffer under run occurs, namely, if the data stored in the buffer memory becomes a predetermined amount or less and restarting data record while maintaining continuity if data is stored. (For example, refer to JP-A-2002-132452.)

Proposed as another unit for monitoring such data stored in buffer memory is a unit provided with a timer for monitoring the amount of the data stored in the buffer memory every predetermined time and temporarily storing data responsive to the free storage space in the buffer memory. (For example, refer to JP-A-2001-290605.)

However, in the optical disk apparatus described in JP-A-2002-132452, if the data stored in the buffer memory becomes the predetermined amount or less while data is being stored, the data record is interrupted and therefore it is impossible to continuously and stably record data on the optical disk. In the optical disk apparatus described in JP-A-2001-290605, the timer circuit is provided for monitoring the buffer memory every predetermined time and the monitor time interval must be set properly and optimum control is hard to perform. The timer circuit is required aside from the circuit configuration involved in data record, the circuit configuration is upsized as compared with the case where the circuit configuration involved in data record is included, and control becomes complicated accordingly.

SUMMARY OF THE INVENTION

The present invention provides an optical disk apparatus which includes only circuitry involved directly in data record and can stably record data on an optical disk under easy control.

According to the invention, there is provided an optical disk apparatus including a data conversion unit that converts input video data into record data, a data record unit that temporarily stores the record data provided by the data conversion unit in buffer memory and writing the record data stored in the buffer memory onto an optical disk while maintaining data continuity, and a control unit that controls the data record unit and the data conversion unit. Preferably, the control unit, when the data conversion unit converts the video data into record data in a predetermined data unit, acquires free space of the buffer memory in a reference data unit smaller than the predetermined data unit, instructs the data record unit to perform processing of storing the record data in the predetermined data unit in the buffer memory in the reference data units based on calculation data of the acquired free space of the buffer memory, and when the record data in the predetermined data unit is stored in the buffer memory, instructs the data conversion unit to perform processing of converting the video data into record data.

In the configuration, when an encoding is input, the control unit outputs an instruction for converting the input video data into (to) record data to the data conversion unit. The data conversion unit (encoder) converts the video data input in the predetermined data unit into record data in accordance with the data conversion instruction. When the record data in the predetermined data unit is generated, the control unit outputs an instruction for calculating the free space of the buffer memory to the data record unit. At the time, the free space is calculated in terms of reference data units, and the calculation data is input to the control unit. The control unit outputs the record data in the predetermined data unit to the data record unit in the reference data units in response to the free space based on the calculation data, and the data record unit stores the data in the buffer memory. The data record unit reads the record data stored in the buffer memory in sequence and records the read data on the optical disk. Detection of the free space of the buffer memory and storage of the record data in the buffer memory area repeated. Upon detection of the termination of the processing in the predetermined data unit, the control unit outputs an instruction for converting video data in the next predetermined data unit to the data conversion unit. Thus, in the configuration of the invention, data conversion, calculation of the free space of the buffer memory, and storage of the data in the buffer memory are repeated, whereby the record data can be stored in the buffer memory and control is facilitated. Further, as the reference data unit of the data amount smaller than the predetermined data unit is used for calculating the free space of the buffer memory, calculation of the free space of the buffer memory and storage of the data in the buffer memory can be performed in detail, and the free space of the buffer memory can be managed stably.

The invention is characterized by the fact that when a record stop instruction is input, instructs the data record unit to perform processing of storing termination processing data containing the data in the last predetermined data unit, end code data, and padding data in the buffer memory in the reference data units.

In the configuration, when a record stop instruction is input, the control unit calculates the free space of the buffer memory in the reference data units as described above based on the termination processing data containing the data in the last predetermined data unit, end code data, and padding data. The control unit outputs the termination processing data in the reference data units in response to the free space in sequence to the data record unit, which then stores the data in the buffer memory. Thus, in the configuration of the invention, after the termination processing data is converted, calculation of the free space of the buffer memory and storage of the data in the buffer memory are repeated, whereby the end part of the record data can be stored reliably in the buffer memory and control is facilitated.

The invention is characterized by the fact that the predetermined data unit is a video object unit.

In the configuration, a video object unit (VOBU) corresponding to the time length of about 0.4 seconds to 1.0 second is used as the predetermined data unit, so that to record moving image data, the invention (optical disk apparatus) can be applied to both record systems of a VR system using the reference data unit described above as the reference record unit and a video system using the video object unit as the reference record unit.

According to the invention, an optical disk apparatus that can store record data in the buffer memory by repeating data conversion, calculation of the free space of the buffer memory, and storage of the data in the buffer memory for each predetermined data unit and can perform easy data record control can be configured. An optical disk apparatus for performing calculation of the free space of the buffer memory and storage of the data in the buffer memory in detail and stably managing the free space of the buffer memory by using the reference data unit of the data amount smaller than the predetermined data unit for calculating the free space of the buffer memory can be configured. Further, processing is performed only in the portion (circuitry) involved in data record, so that data can be recorded on an optical disk stably under easier control.

DETAILED DESCRIPTION OF THE INVENTION

An optical disk apparatus according to an embodiment of the invention will be discussed with reference to the accompanying drawings.

Figure 1:
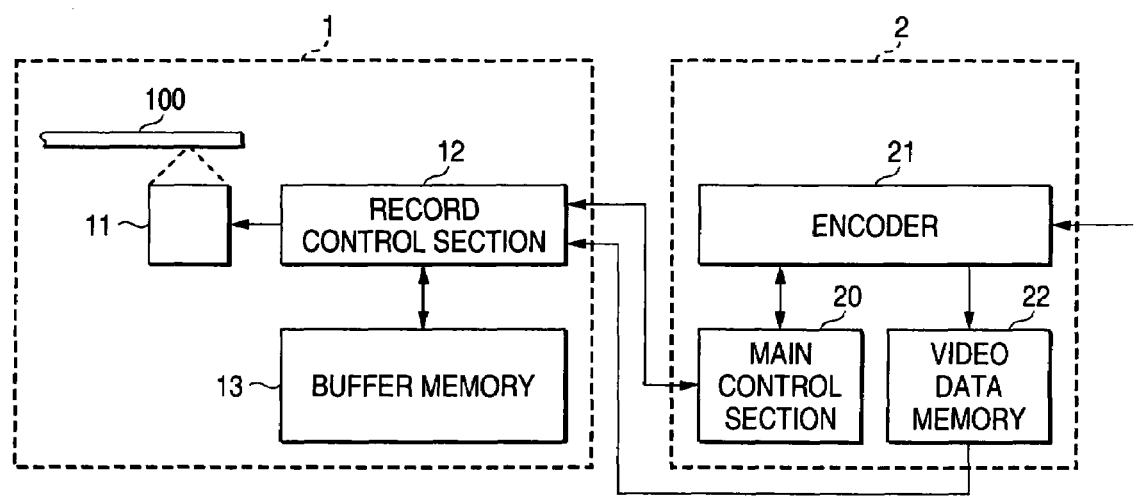
FIG. 1 is a schematic block diagram to show a portion involved in data record processing of an optical disk unit of embodiment of the invention.

FIG. 1 is a schematic block diagram to show a portion involved in data record processing of the optical disk apparatus according to the embodiment.

As shown in FIG. 1, the optical disk apparatus includes a data record section 1 wherein an optical disk 100 is placed for recording data on the optical disk 100 and a system control section 2 for converting input video data into record data and outputting the record data to the data record section 1 and controlling the data record section 1. The data record section 1 and the system control section 2 are connected by a predetermined data transfer line for transferring data between the data record section 1 and the system control section 2. For example, the data record section 1 and the system control section 2 are connected by an IDE bus and record data and control data are transferred according to an ATAPI command.

The data record section 1 includes an optical pickup 11 for applying laser light to a predetermined track of a record face of the optical disk 100, a record control section 12 for outputting record data to the optical pickup 11, and buffer memory 13 for temporarily storing input record data.

The system control section 2 includes an encoder 21 for converting video data into record data, video data memory 22 for temporarily storing input video data, and a main control section 20 for controlling the whole optical disk apparatus containing the system control section 2 and the data record section 1. Here, the encoder 21 corresponds to "data conversion unit" of the invention and the main control section 20 corresponds to "control unit" of the invention.

The encoded data input to the system control section 2 is temporarily stored in the video data memory 22 and is converted to record data and the record data is output to the record control section 12 of the data record section 1. The record control section 12 temporarily stores the input record data in the buffer memory 13, reads the record data in sequence, and outputs a pickup control signal corresponding to the read record data to the optical pickup 11. The optical pickup 11 applies laser light to the record face of the optical disk 100 in accordance with the pickup control signal. At this time, the main control section 20 outputs a seek control instruction for moving the optical pickup 11 to the position corresponding to the data record track of the optical disk 100 to a servo drive circuit (not shown), which then generates a tracking control signal in accordance with the seek control instruction for rotating a stepping motor (not shown) of a traverse mechanism (not shown) including the optical pickup 11 a predetermined amount. The main control section 20 outputs a rotation control instruction for rotating the optical disk 100 at a predetermined linear speed to the servo drive circuit, which then generates a spindle control signal in accordance with the rotation control instruction for rotating a spindle motor connected to a turntable for journaling the optical disk 100 at a constant linear speed. At this time, a focus error signal and a tracking error signal are input to the servo drive circuit, which then controls a focus actuator and a tracking actuator of the optical pickup 11 based on the signals and gathers the laser light applied from the optical pickup 11 on the record surface of a predetermined track.

Accordingly, the record data corresponding to the video data is recorded on the optical disk 100 continuously along the record tracks.

In recording the data on the optical disk 100, it becomes important to always store a predetermined amount or more of record data in the buffer memory 13 of the data record section 1 as described in the related art. That is, monitoring the free storage space of the buffer memory 13 and a storage method of the record data in the buffer memory 13 become important.

Next, the storage method of the record data in the buffer memory 13 will be specifically discussed with reference to FIG. 2.

Figure 2:
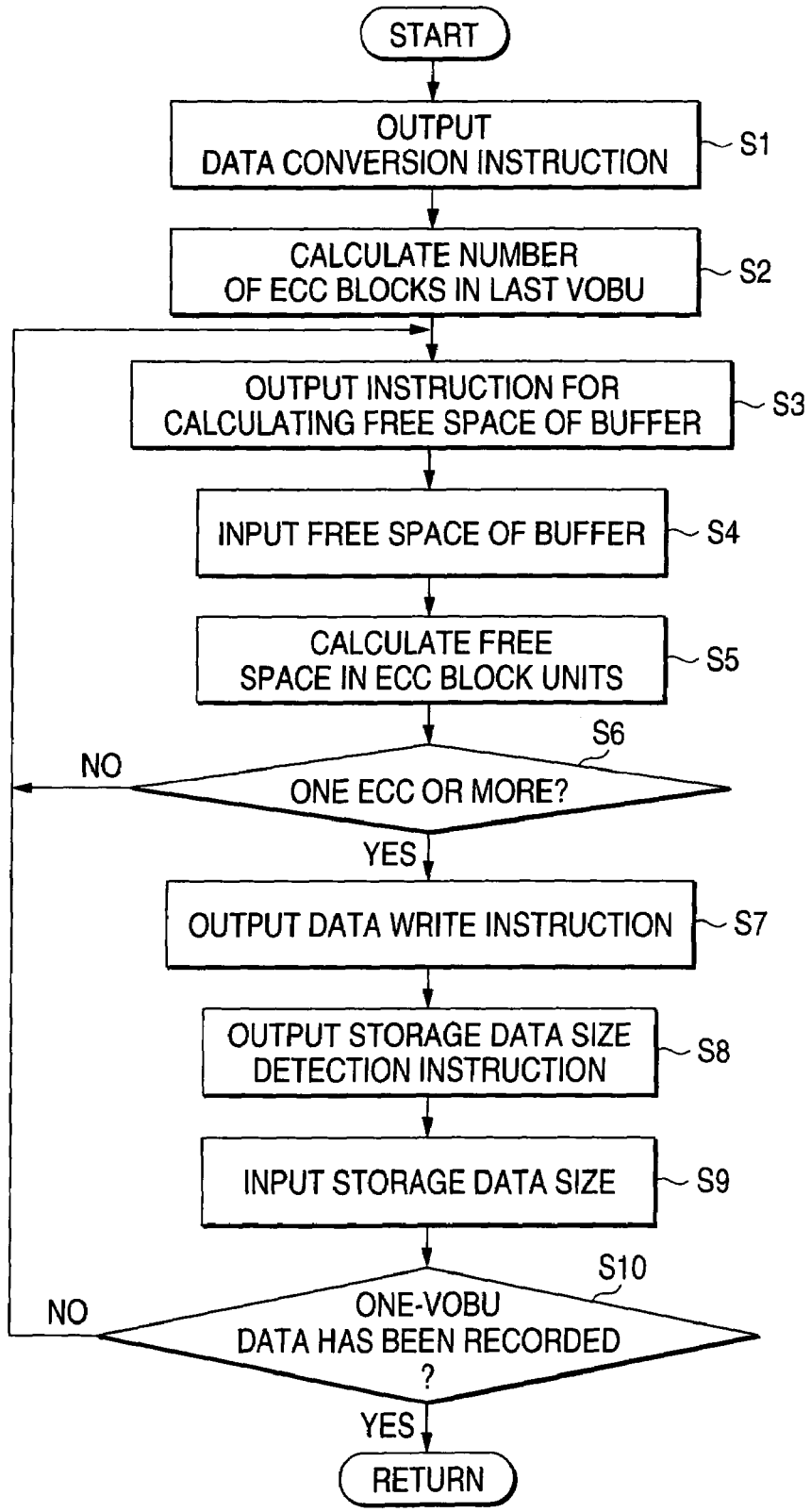
FIG. 2 is a flowchart to show processing of a main control section 20 at the storage processing time of record data in buffer memory 13.

FIG. 2 is a flowchart to show processing of the main control section 20 at the storage processing time of the record data in the buffer memory 13.

When an encoded data is input, the main control section 20 instructs the encoder 22 to process the video data in a video object unit (VOBU), and the encoder 21 processes the video data to record data for each VOBU. One VOBU corresponds to "predetermined data unit" of the invention.

The main control section 20 converts the amount of the encoded one-VOBU record data into the number of ECC blocks each being 2048 bytes as data capacity and corresponding to "reference data unit" of the invention, and calculates the data amount (S2). The main control section 20 also outputs an instruction to the record control section 12 of the data record section 1 for calculating the free space of the buffer memory 13 (S3).

Next, when the free space of the buffer memory 13 is input from the record control section 12, the main control section 20 calculates the free space as the number of ECC blocks (S4 and S5). Here, if the free space is less than one ECC block, again the main control section 20 outputs an instruction to the record control section 12 for calculating the free space of the buffer memory 13 (S6→S3).

Next, if the free space of the buffer memory 13 is one ECC block or more, the main control section 20 outputs a data write instruction to the encoder 21 for outputting data as much as the number of ECC blocks from one VOBU of the already encoded record data based on the calculated number of ECC blocks (S7). The encoder 21 outputs the record data as much as the given number of ECC blocks to the record control section 12 in accordance with the data write instruction. The main control section 20 outputs a storage data size detection instruction to the record control section 12 for detecting the data amount of the record data stored in the buffer memory 13 (S8), checks the input storage data size (S9), and determines whether or not one-VOBU record data has been stored (S10). If one-VOBU record data is not stored, again the main control section 20 outputs an instruction to the record control section 12 for calculating the free space of the buffer memory 13 and repeats the above-described processing (S10→S3).

If the main control section 20 determines that one-VOBU record data has been stored, it outputs a data conversion instruction to the encoder 21 for encoding the input video data or the video data stored in the video data memory 22, and repeats the above-described processing.

By performing such processing, the optical disk apparatus can further detect the free space of the buffer memory in one ECC unit of the data record reference unit each time encoding one VOBU of the video data, and can store the record data of the size responsive to the detection amount in the buffer memory. Accordingly, the free space of the buffer memory can be monitored in detail and the record data can be optimally stored without placing the buffer memory in an empty state, so that data record on the optical disk can be performed stably. In the flow, control is performed only with the circuitry involved in data record and thus the control is facilitated.

Next, a termination method of record processing, namely, the storage termination method of the record data in the buffer memory 13 will be specifically discussed with reference to FIG. 3.

Figure 3:
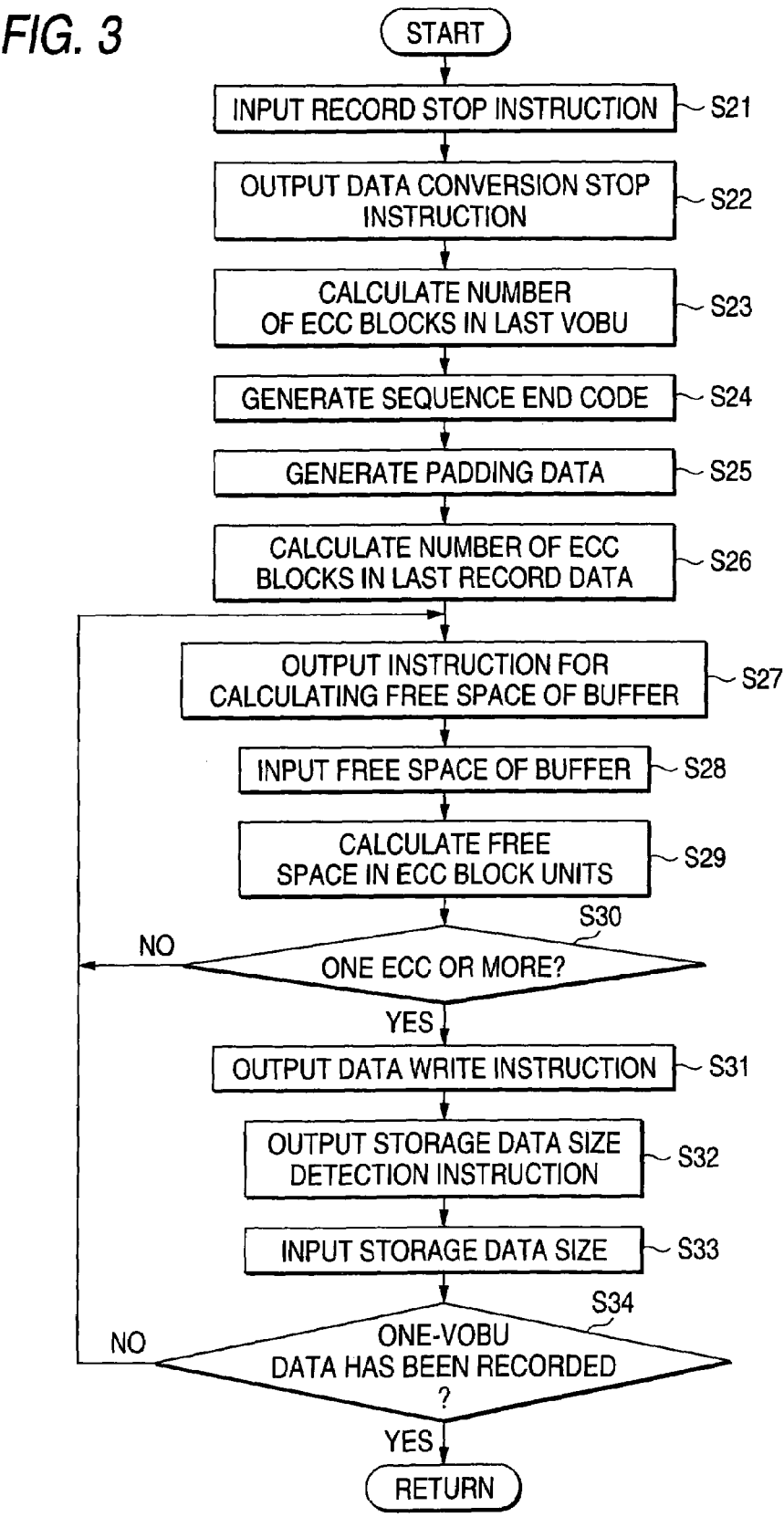
FIG. 3 is a flowchart to show processing of the main control section 20 at the record termination time.

FIG. 3 is a flowchart to show processing of the main control section 20 at the record termination time.

When a record stop instruction is input, the main control section 20 outputs a data conversion stop instruction to the encoder 21 and stops storing new video data in the video data memory 22 (S21 and S22). At the time, if unencoded video data is stored in the video data memory 22, the main control section 20 outputs a data conversion instruction to the encoder 21 for encoding the unencoded video data for each VOBU according to the above-described flow. When detecting the encoder 21 encoding the last VOBU, the main control section 20 outputs a data conversion stop instruction to the encoder 21. At the time, the main control section 20 converts the last VOBU into the number of ECC blocks and calculates the data amount (S23). The main control section 20 also generates sequence end code and padding data output to the record control section 12 together with the last VOBU and converts the data made up of the sequence end code and the padding data into the number of ECC blocks and calculates the data amount (S24 and S25). The main control section 20 adds the data amount in the last VOBU and the amount of the data made up of the sequence end code and the padding data, converts the sum data amount into the number of ECC blocks, and calculates the data amount of the last record data (S26)

Next, the main control section 20 outputs an instruction to the record control section 12 of the data record section 1 for calculating the free space of the buffer memory 13 (S27).

Next, when the free space of the buffer memory 13 is input from the record control section 12, the main control section 20 calculates the free space as the number of ECC blocks (S28 and S29). Here, if the free space is less than one ECC block, again the main control section 20 outputs an instruction to the record control section 12 for calculating the free space of the buffer memory 13 (S30→S27).

If the free space of the buffer memory 13 is one ECC block or more, the main control section 20 outputs a data write instruction to the encoder 21 for outputting data as much as the number of ECC blocks from the last encoded record data based on the calculated number of ECC blocks (S31). The encoder 21 outputs the record data as much as the given number of ECC blocks to the record control section 12 in accordance with the data write instruction. The main control section 20 outputs a storage data size detection instruction to the record control section 12 for detecting the data amount of the record data stored in the buffer memory 13 (S32), checks the input storage data size (S33), and determines whether or not the last record data has been all stored (S34). If the last record data is not all stored, again the main control section 20 outputs an instruction to the record control section 12 for calculating the free space of the buffer memory 13 and repeats the above-described processing (S34→S27). When the last record data has been all stored in the buffer memory 13, the storage processing of the data in the buffer memory 13 is terminated.

As described above, only the last one-VOBU data is managed with the sum data amount of the sequence end code and the padding data, whereby the record data and its attendant control data can be stored in the buffer memory stably and reliably. Accordingly, the optical disk apparatus can record data on an optical disk stably and reliably.

In the description, VOBU is used as the predetermined data unit, but the invention is not limited to it. However, as VOBU is used for recording, the invention can be applied to optical disk apparatus of both specifications of the video system using the VOBU as the record and playback reference unit and the VR system, and general versatility can be provided.

What is claimed is:

1. An optical disk apparatus comprising:
   a data conversion unit that converts input video data into record data;
   a data record unit that temporarily stores the record data provided by the data conversion unit in buffer memory and writes the record data stored in the buffer memory onto an optical disk while maintaining data continuity; and
   a control unit that controls the data record unit and the data conversion unit, wherein
   the control unit acquires free space of the buffer memory in a reference data unit smaller than a video object unit when the data conversion unit converts the video data into record data in the video object unit,
   the control unit instructs the data record unit to perform processing of dividing the record data in the video object unit into the reference data units and of storing in the buffer memory based on calculation data of the acquired free space of the buffer memory,
   the control unit instructs the data conversion unit to perform processing of converting the video data into record data when the record data in the video object unit is stored in the buffer memory, and
   the control unit instructs the data record unit to perform processing of dividing termination processing data made up of data in the last video object unit, end code data, and padding data into the reference data units and of storing in the buffer memory when a record stop instruction is input.

2. An optical disk apparatus comprising:

a data conversion unit that converts input video data into record data;

a data record unit that temporarily stores the record data provided by the data conversion unit in buffer memory and writes the record data stored in the buffer memory onto an optical disk while maintaining data continuity; and a control unit that controls the data record unit and the data conversion unit, wherein the control unit acquires free space of the buffer memory in a reference data unit smaller than a video object unit when the data conversion unit converts the video data into record data in the video object unit, the control unit instructs the data record unit to perform processing of storing the record data in the video object unit in the buffer memory in the reference data units based on calculation data of the acquired free space of the buffer memory, and the control unit instructs the data conversion unit to perform processing of converting the video data into record data when the record data in the video object unit is stored in the buffer memory.

3. The optical disk apparatus as claimed in claim 2, wherein the control unit instructs the data record unit to perform processing of storing termination processing data including data in a last video object unit, end code data, and padding data in the buffer memory in the reference data units when a record stop instruction is input.

4. An optical disk recording method of an optical disk apparatus which includes:

a data conversion unit that converts input video data into record data; and a data record unit that temporarily stores the record data provided by the data conversion unit in buffer memory and writes the record data stored in the buffer memory onto an optical disk while maintaining data continuity, the method comprising:

acquiring free space of the buffer memory in a reference data unit smaller than a video object unit when the data conversion unit converts the video data into record data in the video object unit;

instructing the data record unit to perform processing of dividing the record data in the video object unit into the reference data units and of storing in the buffer memory based on calculation data of the acquired free space of the buffer memory;

instructing the data conversion unit to perform processing of converting the video data into record data when the record data in the video object unit is stored in the buffer memory; and instructing the data record unit to perform processing of dividing termination processing data made up of data in the last video object unit, end code data, and padding data into the reference data units and of storing in the buffer memory when a record stop instruction is input.

* * * * *